US010037643B2

(12) United States Patent
Arikawa

(10) Patent No.: US 10,037,643 B2
(45) Date of Patent: Jul. 31, 2018

(54) BILL PROCESSING DEVICE

(71) Applicant: LAUREL PRECISION MACHINES CO., LTD., Osaka-shi, Osaka (JP)

(72) Inventor: Junichi Arikawa, Kawaguchi (JP)

(73) Assignee: LAUREL PRECISION MACHINES CO., LTD., Osaka (JP)

( * ) Notice: Subject to any disclaimer, the term of this patent is extended or adjusted under 35 U.S.C. 154(b) by 0 days.

(21) Appl. No.: 15/171,386

(22) Filed: Jun. 2, 2016

(65) Prior Publication Data

US 2016/0358400 A1 Dec. 8, 2016

(30) Foreign Application Priority Data

Jun. 8, 2015 (JP) ................................. 2015-115626

(51) Int. Cl.

| | |
|---|---|
| ***G06K 9/00*** | (2006.01) |
| ***G07D 7/20*** | (2016.01) |
| ***G06K 9/20*** | (2006.01) |
| ***G07D 11/00*** | (2006.01) |
| ***G07D 7/0047*** | (2016.01) |
| ***G07D 7/202*** | (2016.01) |

(52) U.S. Cl.

CPC ......... *G07D 7/2025* (2013.01); *G06K 9/2063* (2013.01); *G07D 7/0047* (2017.05); *G07D 7/202* (2017.05); *G07D 7/2075* (2013.01); *G07D 11/0021* (2013.01); *G06K 2209/01* (2013.01)

(58) Field of Classification Search

None

See application file for complete search history.

(56) References Cited

U.S. PATENT DOCUMENTS 8,644,583 B1 * 2/2014 Mennie .................. G07D 7/003 209/534
8,644,584 B1 * 2/2014 Mennie ................ G06Q 20/042 209/534
9,141,876 B1 * 9/2015 Jones ........................ G06K 9/60
9,477,896 B1 * 10/2016 Mennie .................. G07D 7/003
(Continued)

FOREIGN PATENT DOCUMENTS

CN 101739747 A 6/2010
CN 102005078 A 4/2011
(Continued)

OTHER PUBLICATIONS

Office Action dated Mar. 1, 2017 in Taiwanese Application No. 105117865, with English translation (6 pages).
(Continued)

*Primary Examiner* — Nancy Bitar

(74) *Attorney, Agent, or Firm* — Nixon & Vanderhye P.C.

(57) ABSTRACT

A bill processing device includes: a loading unit that feeds a bill having a pair of serial number information; a reading unit that reads the pair of serial number information from the fed bill; a determining unit that determines whether at least a portion of the pair of serial numbers match each other; a stacking unit that stacks the bill in a case where the determining unit has determined that the at least a portion of the pair of serial numbers match each other; and a reject unit that receives the bill in a case where the determining unit has determined that the at least a portion of the pair of serial numbers do not match each other.

9 Claims, 5 Drawing Sheets

(56) References Cited

U.S. PATENT DOCUMENTS

| | | | | |
|---|---|---|---|---|
| 2009/0001157 | A1 | 1/2009 | Buntscheck et al. | |
| 2013/0047869 | A1 | 2/2013 | Kataoka et al. | |
| 2014/0198967 | A1 * | 7/2014 | Hamasaki ................ | G06K 9/00 382/135 |

FOREIGN PATENT DOCUMENTS

| | | | |
|---|---|---|---|
| CN | 102968843 | | 3/2013 |
| CN | 103177503 | A | 6/2013 |
| CN | 103221980 | A | 7/2013 |
| DE | 10 2008 048 768 | A1 | 3/2010 |
| JP | 2013-050811 | | 3/2013 |
| JP | 2014-115811 | A | 6/2014 |
| TW | 200919377 | A | 5/2009 |
| TW | 201312507 | A1 | 3/2013 |
| WO | WO 02/31779 | A2 | 4/2002 |

OTHER PUBLICATIONS

Extended European Search Report dated Feb. 7, 2017 in European Application No. 16173060.1 (9 pages).

Partial European Search Report dated Nov. 23, 2016 in EP Application No. 16173060.1 (7 pages).

KIPO Notice of Grounds of Rejection dated Sep. 28, 2017, in Korean Application No. 10-2016-0069476, with English translation (10 pages).

Office Action of the Intellectual Property Office dated Oct. 16, 2017 in Taiwanese Application No. 105117865, with English translation (9 pages).

* cited by examiner

BILL PROCESSING DEVICE

BACKGROUND OF THE INVENTION

Field of the Invention

The present invention relates to a bill processing device.

Priority is claimed on Japanese Patent Application No. 2015-115626, filed Jun. 8, 2015, the content of which is incorporated herein by reference.

Description of Related Art

In paper sheet processing devices, there is a technique for reading a serial number formed on a paper sheet and determining whether or not it is genuine (for example, refer to Japanese Unexamined Patent Application, First Publication No. 2013-50811).

It is required to perform more accurate authenticity determination in a bill processing device.

SUMMARY OF THE INVENTION

An object of the present invention is to provide a bill processing device that can perform more accurate authenticity determination.

A bill processing device according to an aspect of the present invention includes: a loading unit that feeds a bill having a pair of serial number information; a reading unit that reads the pair of serial number information from the fed bill; a determining unit that determines whether at least a portion of the pair of serial numbers match each other; a stacking unit that stacks the bill in a case where the determining unit has determined that the at least a portion of the pair of serial numbers match each other; and a reject unit that receives the bill in a case where the determining unit has determined that the at least a portion of the pair of serial numbers do not match each other.

According to the above bill processing device, the reading unit reads from bill fed by the loading unit the pair of serial number information of the bill, and the determining unit determines whether at least a portion of the pair of serial number information match each other. The reject unit receives the bill in a case where the determining unit has determined that the at least a portion of the pair of serial numbers match each other. That is, paying attention to the fact that the pair of serial number information match each other in a genuine bill, a bill in which a least a portion of the pair of serial number information do not match each other is judged to be a counterfeit bill and are received by the reject unit. Accordingly, it is possible to perform more accurate authenticity determination.

In the above bill processing device, the determining unit may determine whether predetermined partial common sections of the pair of serial numbers match each other. According to this bill processing device, since the determining unit determines whether the predetermined partial common sections of the pair of serial number information match each other, the determination process of whether or not the pair of serial number information match each other becomes easy, and a shortening of the determination process time is achieved.

The above bill processing device may further include: a setting unit that sets the predetermined partial common sections. According to this bill processing device, since the setting unit sets the predetermined partial common sections, it is possible to appropriately match the predetermined partial sections determining whether or not a pair of serial number information match each other with counterfeit bills that are in circulation.

The above bill processing device may further includes: an image data capture unit that captures image data of the fed bill; a compositing unit that composites, on the captured image data, image data for highlighting the predetermined partial common sections, to generate composite image data; and a display unit that displays the composite image data. According to this bill processing device, the compositing unit composites image data for highlighting of the predetermined partial common sections on the captured image data. The display unit displays the composite image data. Thereby, from the composite image data, it is possible to easily confirm the predetermined partial common sections used when judging the agreement of a pair of serial number information.

The above bill processing device may further include: an image data capture unit that captures image data of an unreadable bill whose serial number information is unreadable by the reading unit; an input unit that receives an input of serial number information; a compositing unit that composites, on the image data of the unreadable bill, image data showing the input serial number information, to generate composite image data; and a display unit that display the composite image data. According to this bill processing unit, an operator may visually confirm serial number information of an unreadable bill and input the visually confirmed serial number information into the input unit. In this case, the compositing unit composites, on the image data of the unreadable bill, image data showing the input visually confirmed serial number information, and the display unit displays the composite image data. Thereby, it is possible to easily confirm the image data of the unreadable bill on which image data showing the input serial number information is composited.

In the above bill processing device, the input unit may receive, as the input of the serial number information, an input of serial number information including a symbol indicating an unclear part, and the compositing unit may composite, on the image data of the unreadable bill, image data showing the input serial number information including the symbol. According to this bill processing device, the input unit receives an input of serial number information including a symbol indicating an unclear part, the compositing unit composites, on the image data of an unreadable bill, image data showing the input serial number information including the symbol, and the display unit displays the composite image data. Thereby, it is possible to easily confirm the image data of the unreadable bill on which the image data showing the serial number information including the symbol is composited.

DETAILED DESCRIPTION OF THE INVENTION

Figure 1:
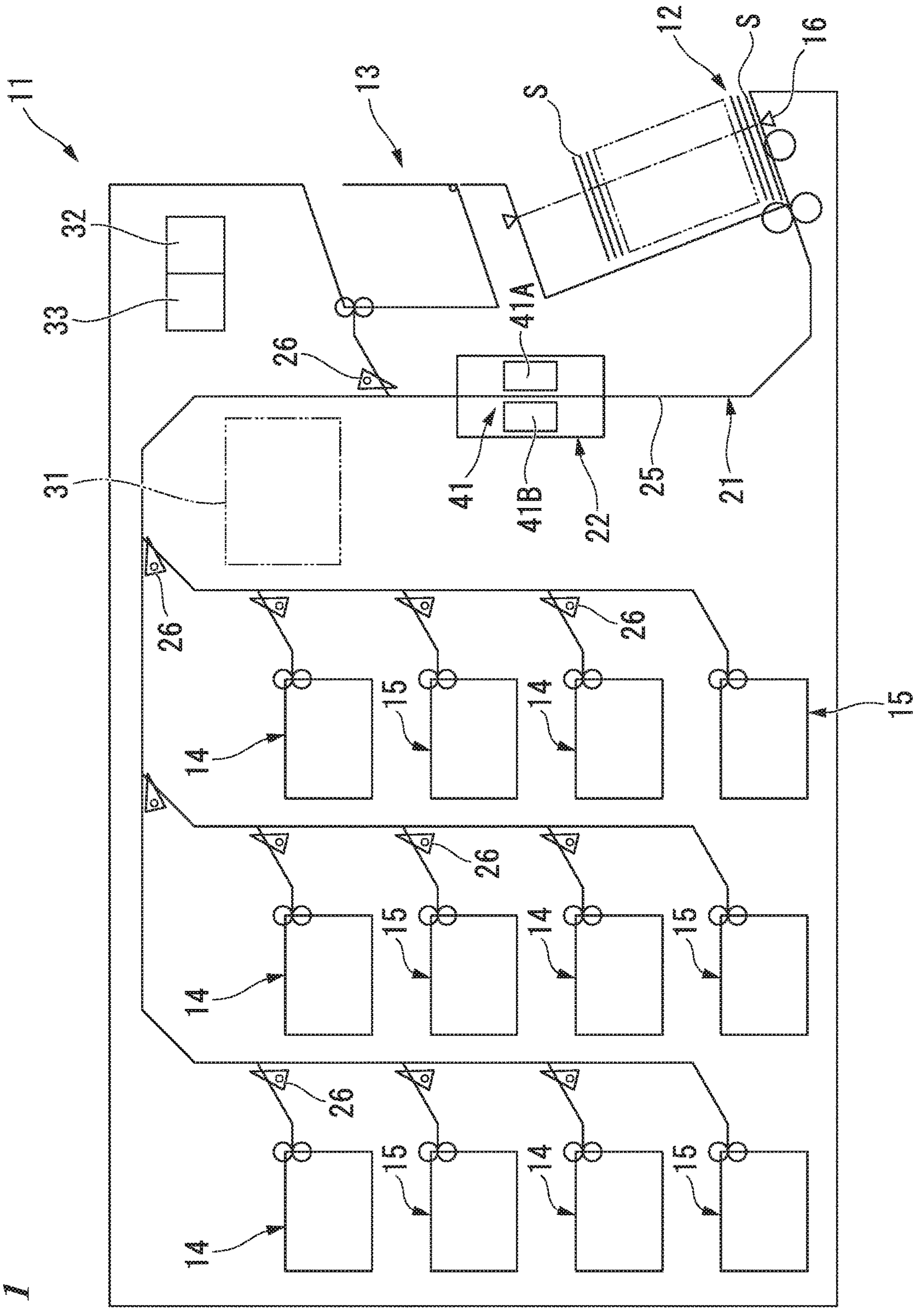
FIG. 1 is an outline block diagram of a bill processing device according to an embodiment of the present invention viewed from the front of the bill processing device.

A bill processing device according to an embodiment of the present invention will be described below referring to the drawings. FIG. 1 shows a bill processing device 11 according to the present embodiment. The bill processing device 11 performs an identification process. More specifically, the bill processing device 11 identifies bills S and from among them counts only normal bills by denomination, and calculates the total sum thereof. Moreover, the bill processing device 11 excludes reject bills other than normal bills. Normal bills mean bills S that are counted by denomination in the identification process of the bill processing device 11. Reject bills mean bills S that are excluded without being counted in the identification process of the bill processing device 11. This bill processing device 11 may for example be used for counting sales proceeds.

The bill processing device 11 includes a loading unit 12, a first reject unit 13 (reject unit), a plurality of (specifically six) second reject units 14, a plurality of (specifically six) stacking units 15, and a set detection sensor 16. The loading unit 12 is provided at the lower part of the right side surface of the bill processing device 11, and opens to the right side. The first reject unit 13 is provided in the middle part in the vertical direction on the right side surface of the bill processing device 11, and opens to the right. The second reject units 14 are provided to the left of the first reject unit 13 and open to the front of the bill processing device 11. The stacking units 15 are adjacently arranged below corresponding second reject units, and open to the front of the bill processing device 11. The set detection sensor 16 is provided in the loading unit 12, and detects the presence of a set of bills S.

The plurality of second reject units 14 and the plurality of stacking units 15 all have the same structure, and are arranged in an array of three columns and four stages so that they are positioned at points of intersection of a lattice. Specifically, one second reject unit 14 is provided at the highest stage of the right column, and one stacking unit 15 corresponds to that second reject unit 14 and is provided at the second stage from the top of the right column. One second reject unit 14 is provided at the third stage from the top of the right column, and one stacking unit 15 corresponds to that second reject unit 14 and is provided at the lowest stage of the right column. Similarly, at the middle column, one second reject unit 14, one stacking unit 15 corresponding thereto, one second reject unit 14, and one stacking unit 15 corresponding thereto are arranged from the top in this order. Similarly, at the left column, one second reject unit 14, one stacking unit 15 corresponding thereto, one second reject unit 14, and one stacking unit 15 corresponding thereto are arranged from the top in this order.

The bills S are set in the loading unit 12 in the state of being stacked in the vertical direction. The loading unit 12 separates and feeds the stacked bills S one at a time from the lowest bill and sends them into the bill processing device 11. The bill processing device 11 further includes a conveying unit 21 (loading unit, reject unit, first reject unit, second reject unit) and an identifying unit 22 in the inside thereof. The conveying unit 21 conveys the bills S fed from the loading unit 12. The identifying unit 22 counts the bills S being conveyed by the conveying unit 21 while identifying their authenticity, denomination and the like.

The conveying unit 21, based on the identification result of the identifying unit 22, selectively sorts the bills S to any one of the first reject unit 13, any one of the plurality of second reject units 14, or any one of the plurality of stacking units 15.

The conveying unit 21 includes a conveyance path 25 that is arranged partitioned in an appropriate manner so as to tie together the respective units, and a plurality of sorting units 26 that are provided at each branching position of the conveyance path 25 and that sort the bills S.

The first reject unit 13 excludes first reject bills from among the bills S fed from the loading unit 12 so that they can be taken out of the bill processing device 11. The first reject bills are the bills S that have been identified to have a predetermined anomaly by the identifying unit 22. The first reject unit 13 stacks the first reject bills sent from the conveying unit 21 from the bottom to the top in the order they are sent (that is, in the order in which the loading unit 12 feeds them out). The first reject bills are bills S that are not counted on a per-denomination basis in the identification process of the bill processing device 11.

Each of the plurality of second reject units 14 excludes second reject bills from among the bills fed from the loading unit 12 so that they can be taken out of the bill processing device 11. The second reject bills are the bills S that have been identified to be not normal by the identifying unit 22 and have a predetermined anomaly of a different type from the first reject bills. Each of the plurality of second reject units 14 stacks the second reject bills sent from the conveying unit 21 from the bottom to the top in the order in which they are sent (that is, in the order in which the loading unit 12 feeds them out). Similar to the first reject bills, the second reject bills are bills S that are not counted on a per-denomination basis in the identification process of the bill processing device 11.

Each of the plurality of stacking units 15 stack normal bills from among the bills S fed from the loading unit 12 so that they can be taken out from the bill processing device 11. The normal bills are the bills S that have been identified to be normal by the identifying unit 22. Each of the plurality of stacking units 15 stacks from the bottom to the top the normal bills sent from the conveying unit 21 in the order in which they are sent (that is, in the order in which the loading unit 12 feeds them out). The normal bills are the bills S that are counted by denomination in the identification process of the bill processing device 11.

The bill processing device 11 further includes an operation display unit 31 (input unit, display unit, setting unit) in the front face thereof. The operation display unit 31 accepts operation inputs and displays information. The bill processing device 11 further includes a control unit 32 (discriminating unit) and a storage unit 33 (image data storage unit) in the inside thereof. The control unit 32 controls respective units of the bill processing device 11 such as the loading unit 12, the conveying unit 21, the identifying unit 22 and the like. The storage unit 33 stores master data serving as a reference for identification and data of the identification and counting results. Some or all of the data stored in the storage unit 33 may be stored in another database device different from the bill processing device 11 that includes this storage unit 33, and the data may be written and read by communication.

The identifying unit 22 includes an image data capture unit 41 (reading unit, image data capture unit) that captures image data of both faces (first and second faces) of the bill S. The image data capture unit 41 includes one face image detecting unit 41A (first face image detecting unit) and an other face image detecting unit 41B (second face image detecting unit). The one face image detecting unit 41A scans an image of one side face (first side face) in the thickness direction of the bill S moving on the conveying unit 21. The other face image detecting unit 41B scans an image of the other side face (second side face) in the thickness direction of the bill S moving on the conveying unit 21. For example, a CCD camera, line sensor or the like may be used as the one face image detecting unit 41A and the other face image detecting unit 41B. The one face image detecting unit 41A and the other face image detecting unit 41B constituting the image data capture unit 41 are connected to the control unit 32. On the basis of the image data detected by the one face image detecting unit 41A and the other face image detecting unit 41B, the control unit 32 identifies whether the bills S that are set in the loading unit 12 from outside the machine are normal bills, first reject bills, or second reject bills, identifies denominations of the normal bills, counts the normal bills on a per-denomination basis, and calculates the total sum of money.

Figure 2:
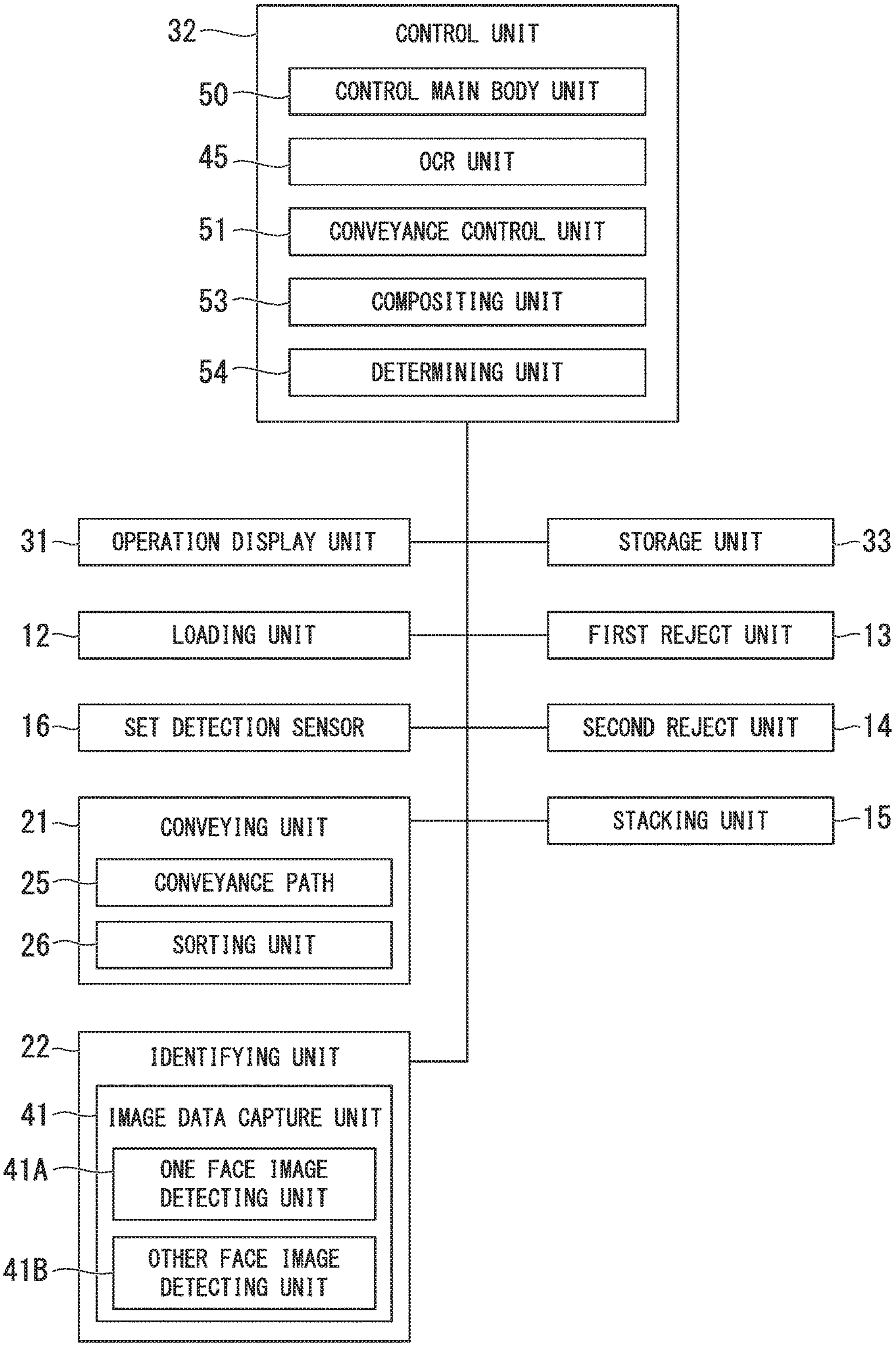
FIG. 2 is a block diagram of a control system of the bill processing device according to the embodiment of the present invention.

As shown in FIG. 2, the control unit 32 includes an optical character recognition (OCR) unit 45 (reading unit). The OCR unit 45 is an optical character reading device. The OCR unit 45 reads character information from image data of the bill S detected by the one face image detecting unit 41A and the other face image detecting unit 41B, and from among the read character information extracts a pair of serial number information (serial numbers) D shown in FIG. 3 that are formed by printing on each bill S. In other words, the image data capture unit 41 and the OCR unit 45 read the pair of serial number information D formed on bills S fed by the loading unit 12. The pair of serial number information D are only formed only on one face of the bill S. Accordingly, image detection of both faces of the bill S by the one face image detecting unit 41A and the other face image detecting unit 41B is necessary. Any kind of arrangement configuration may be adopted for the arrangement of the one face image detecting unit 41A and the other face image detecting unit 41B provided it is possible to capture images of both faces of the bill S and reliably read the pair of serial number information formed on either face. The pair of serial number information D are printed at prescribed positions that are set for each bill.

The storage unit 33 stores, master data for each domination serving as reference data. The master data is used for comparison with the images of the bills S detected by the one face image detecting unit 41A and the other face image detecting unit 41B. The master data for each denomination of bill S includes at least the patterns of both faces of each bill S, and may include data of the pattern, coloring and shades of colors. The data of patterns, coloring, and shades of colors are the main discrimination data serving as the main body for discrimination when discriminating whether or not a bill S is a normal bill or not.

The control unit 32 includes a control main body unit 50, a conveyance control unit 51 (stacking unit, reject unit, first reject unit, second reject unit), a compositing unit 53, and a determining unit 54. The conveyance control unit 51, by controlling the conveying unit 21, that is, the conveyance path 25 and the sorting units 26, selectively conveys the bills S fed from the loading unit 12 to the first reject unit 13, the plurality of second reject units 14, or the plurality of stacking units 15, on the basis of the determination result of the determining unit 54. The compositing unit 53 processes data to be stored in the storage unit 33 or data that has been stored in the storage unit 33.

The control main body unit 50 of the control unit 32 stores in the storage unit 33 the serial number information of bills targeted for exclusion, that is, excluded serial number information (excluded serial number), input to the operation display unit 31. That is, in a setting input mode in which input guidance is performed using the operation display unit 31, the control main body unit 50 enables the input of excluded serial number information via the operation display unit 31 and, when excluded serial number information is input via the operation display unit 31, causes them to be stored in the storage unit 33. Counterfeit bills are often printed in a plurality with the same serial number information. Therefore, by setting the serial number information formed on counterfeit bills discovered in the past as excluded serial number information, it is possible to find counterfeit bills.

Figure 3:
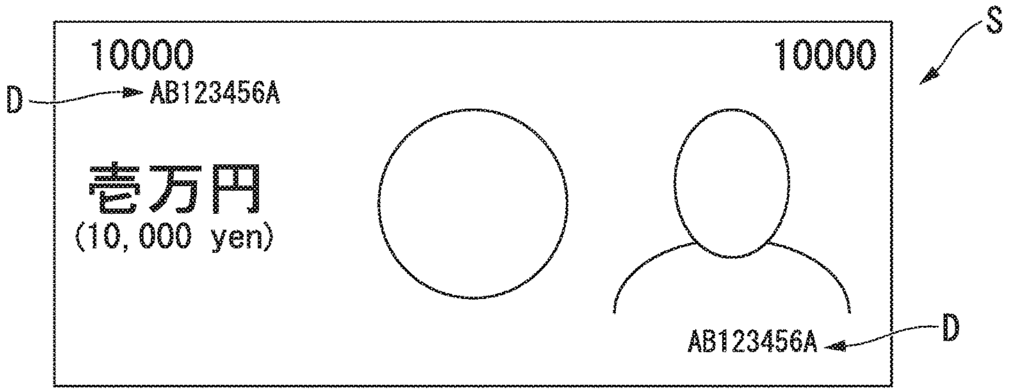
FIG. 3 is a front view of a bill processed by the bill processing device according to the one embodiment of the present invention, the bill being one whose serial number information can be read.

The excluded serial number information to be input may be, of course, the entire character string of numbers and letters (for example, "AB123456A" of FIG. 3) that is the information specifying the code itself of the serial number information (serial number) of the bill S shown in FIG. 3. The excluded serial number information to be input may be the number string (for example, "123456" of FIG. 3), which is information specifying the numerical part of the serial number information of the bill S. The excluded serial number information to be input may be a letter or character string of the alphabet (for example, "AB" of FIG. 3) that is information specifying the letters of the head mark of the serial number information of the bill. The excluded serial number information to be input may be a predetermined partial section of the entire character string (for example, "12" at the third and fourth places of "AB123456A" in FIG. 3). The excluded serial number information to be input may be the color of the serial numbers of the bill S (for example "black").

When the entire character string constituting numbers and letters, which is the serial number information D of the bill S, is input as the excluded serial number information, the control main body unit 50 stores the character string that has been input as excluded serial number information in the storage unit 33. When the number string of the numerical part of the serial number information D of the bill S is input as excluded serial number information, the control main body unit 50 stores the number string that has been input as excluded serial number information in the storage unit 33. When the letter(s) of the head mark of the serial number information D of the bill S is/are input as excluded serial number information, the control main body unit 50 stores the letter(s) that has/have been input as excluded serial number information in the storage unit 33. When the color of the serial number information D of the bill S is selected and input as excluded serial number information, the control main body unit 50 stores the color of the serial numbers in the storage unit 33. Of course, it is also possible to store appropriate combinations of these types of excluded serial number information.

Hereinbelow, for the purpose of illustration, a description will be given taking as an example the case of an entire character string of numbers and letters (for example, "AB123456A" of FIG. 3) being input as excluded serial number information and thereby stored in the storage unit 33 as excluded serial number information.

The determining unit 54 determines, from image data of the bill S that is detected by the one face image detecting unit 41A and the other face image detecting unit 41B of the image data capture unit 41, whether this bill S is a normal bill that will be counted per-denomination and stacked in the stacking unit 15, is a first reject bill that will be excluded to the first reject unit 13 without being counted per-denomination, or is a second reject bill that will be excluded to the second reject unit 14 without being counted per-denomination.

Specifically, based on image data of the bill S detected by the one face image detecting unit 41A and the other face image detecting unit 41B of the image data capture unit 41, the determining unit 54 has determined that this bill S is in a skewed state of being inclined by a predetermined angle or more with respect to the conveyance direction, the determining unit 54 determines it to be a first reject bill. Also, if the determining unit 54 has determined that this bill is in a near-feed state, the determining unit 54 determines it to be a first reject bill. The near-feed state means that the bill S of a determination target is being approached, within a predetermined distance or less, the bill S detected by the image data capture unit 41 immediately before the detection of the bill S of the determination target. Since there is a high possibility of both a skewed bill and a near-feed bill being the cause of a jam, they are determined to be first reject bills and excluded to the first reject unit 13.

In the case of a bill S that is neither in the skewed state nor in the near-feed state, the determining unit 54 compares main discrimination data of this bill S with the master data of each denomination stored in the storage unit 33, and determines whether or not there is master data of a denomination that matches to the main discrimination data with a predetermined matching degree or more. The main discrimination data includes the pattern, coloring and shades of colors included in the image data of this bill S detected by the one face image detecting unit 41A and the other face image detecting unit 41B of the image data capture unit 41. In the case of having determined that the main discrimination data not matches with master data of any denomination by the predetermined matching degree or more, the determining unit 54 determines this bill S to be a first reject bill and excludes it to the first reject unit 13. Examples of bills S whose main discrimination data do not match by a predetermined matching degree or more with master data of any denomination include counterfeit bills, damaged bills, or foreign currency bills.

In the case of the main discrimination data of the image data matching by a predetermined matching degree or more with the master data of any denomination, the determining unit 54 temporarily determines the denomination of this bill S to be the matching denomination of the master data. That is, this bill S is a bill for which denomination identification is possible by the image data capture unit 41 of the identifying unit 22 and the determining unit 54.

Next, the determining unit 54 determines whether or not it was possible to read the pair of serial number information of this bill S by the OCR unit 45. That is, the determining unit 54 determines whether or not the OCR unit 45 has read the pair of serial number information of this bill S. In the case of having determined that at least one of the pair of serial number information D was unreadable with the OCR unit 45 (that is, in the case of having determined that at least one of the pair of serial number information D was not read the OCR unit 45), the determining unit 54 determines this bill S to be a second reject bill and excludes it to the second reject unit 14.

In the case of having determined that each of the pair of serial number information D was readable by the OCR unit 45 (that is, in the case of having determined that each of the pair of serial number information D was read by the OCR unit 45), the determining unit 54 determines whether or not the pair of serial number information (first serial number information and second serial number information) D of this bill S that have been read match each other. That is, the determining unit 54 determines whether or not the entire character string of numbers and letters that is one of the pair of serial number information D formed on this bill S (first serial number information) and the entire character string of numbers and letters that is the other (first serial number information) completely match each other. In the case of the pair of serial number information D not matching each other, the determining unit 54 determines this bill S to be a first reject bill and excludes it to the first reject unit 13.

In the case of having determined that the pair of serial number information D matches each other, the determining unit 54 determines whether or not an entry matching the serial number information D of this bill S that was read is among the plurality of pieces of excluded serial number information stored in the storage unit 33. That is, in the case of an entry corresponding to the serial number information D read by the image data capture unit 41 and the OCR unit 45 being among the plurality of pieces of excluded serial number information, the determining unit 54 determines this bill S to be a first reject bill to be excluded, and excludes it to the first reject unit 13. Specifically, in the case of the character string of for example "AB123456A" specifying the number itself of the serial number information D of the bill S being stored in the storage unit 33 as excluded serial number information, the determining unit 54 determines a bill in which the character string of the serial number information D read by the OCR unit 45 from the image captured by the image data capture unit 41 is "AB123456A," which is this excluded serial number information, to be a first reject bill.

On the other hand, in the case of an entry corresponding to the serial number information D read by the image data capture unit 41 and the OCR unit 45 not being among the plurality of pieces of excluded serial number information stored in the storage unit 33, the determining unit 54 determines this bill S to be a normal bill, and causes it to be stacked in the stacking unit 15. The determining unit 54 confirms the denomination that was temporarily determined in the above manner, and counts up the count value of the denomination of this bill S by one. On the other hand, the determining unit 54 does not cause bills S determined to be first reject bills and bills S determined to be second reject bills to be reflected in count values.

As described above, a bill S that is determined by the determining unit 54 to be a normal bill and that is stacked in the stacking unit 15 meets all the following criteria: It is not a skewed bill; it is not a near-feed bill; its main discrimination data match the master data by a predetermined matching degree or more (in other words, denomination identification is possible); both of a pair of serial number information D are readable; the pair of serial number information D match each other; and an entry matching the pair of serial number information D is not among the plurality of pieces of excluded serial number information. Thereby, the conveying unit 21, the stacking unit 15, and the conveyance control unit 51, which stack normal bills among the bills S fed from the loading unit 12, stack the bills S whose serial number information D can be read by the image data capture unit 41 and the OCR unit 45 and whose read serial number information D do not fall under those subject to exclusion, and moreover stack the bills S whose pair of serial number information D have been determined to match each other by the determining unit 54. In addition, the conveying unit 21, the stacking unit 15, and the conveyance control unit 51, which stack normal bills among the bills S fed from the loading unit 12, stack the bills S whose denomination can be identified by the image data capture unit 41 of the identifying unit 22 and whose serial number information D can be read by the image data capture unit 41 and the OCR unit 45.

Figure 4:
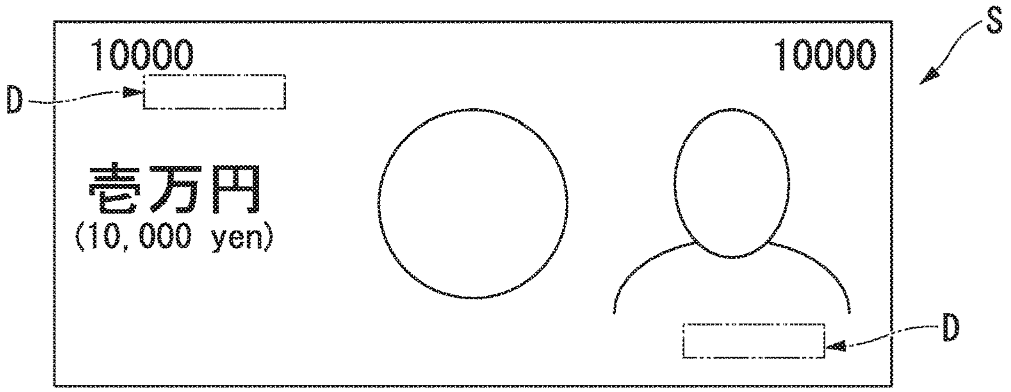
FIG. 4 is a front view of a bill processed by the bill processing device according to the embodiment of the present invention, the bill being one whose serial number information cannot be read.

The second reject bill meets all the following criteria: It is not a skewed bill; it is not a near-feed bill; its main discrimination data match the master data by a predetermined matching degree or more; and as shown in FIG. 4 at least either one of its pair of serial number information D is not readable. Thereby, the conveying unit 21, the second reject unit 14, and the conveyance control unit 51, which exclude second reject bills from among the bills S fed by the loading unit 12, reject those bills whose serial number information D cannot be read by the image data capture unit 41 and the OCR unit 45. Also, the conveying unit 21, the second reject unit 14, and the conveyance control unit 51, which exclude the second reject bills from among the bills S fed by the loading unit 12, exclude the bills S whose denomination cannot be identified by the image data capture unit 41 of the identifying unit 22 and whose serial number information cannot be read by the image data capture unit 41 and the OCR unit 45.

Figure 5:
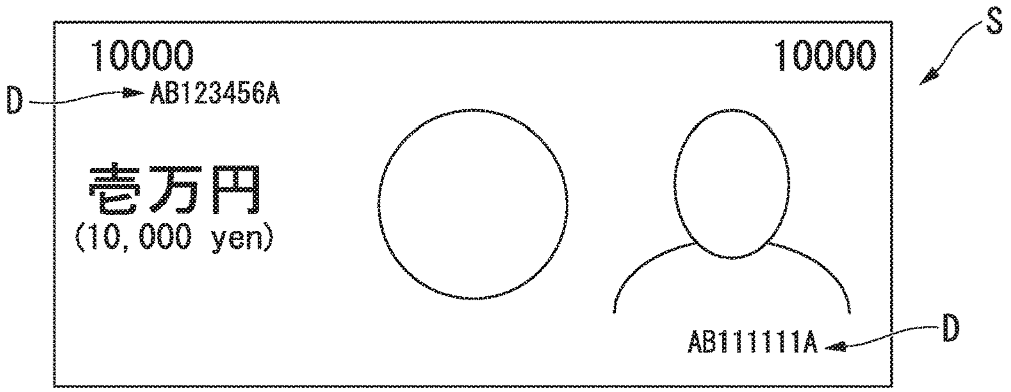
FIG. 5 is a front view of a bill processed by the bill processing device according to the embodiment of the present invention, the bill being one whose pair of serial number information do not match.

The first reject bill is a bill other than the normal bill and the second reject bill. That is, the first reject bills include a skewed bill, a near-feed bill, and a bill whose main discrimination data do not match the master data by a predetermined matching degree or more. Also, the first reject bills include bills S that meet all the following criteria: They are not skewed bills; they are not near-feed bills; their main discrimination data match the master data; their pair of serial number information D can be read; and the pair of serial number information D do not match each other as shown in FIG. 5. In addition, the first reject bills include bills S that meet all the following criteria: They are not skewed bills; they are not near-feed bills; their main discrimination data match the master data, their pair of serial number information D can both be read; the pair of serial number information D match each other; and the pair of serial number information D are included in one of pieces of the excluded serial number information.

Thereby, the conveying unit 21, the first reject unit 13, and the conveyance control unit 51, which exclude the first reject bills from among the bills S fed by the loading unit 12, exclude bills S whose serial number information D can be read by the image data capture unit 41 and the OCR unit 45 and whose read serial number information D falls under the those subject to exclusion, and the determining unit 54 excludes the bills S whose pair of serial number information D do not match each other. Also, the conveying unit 21, the first reject unit 13, and the conveyance control unit 51, which exclude the first reject bills from among the bills S fed by the loading unit 12, exclude bills S whose denomination cannot be identified by the image data capture unit 41 of the identifying unit 22, in addition to skewed bills and near-feed bills.

Figure 6:
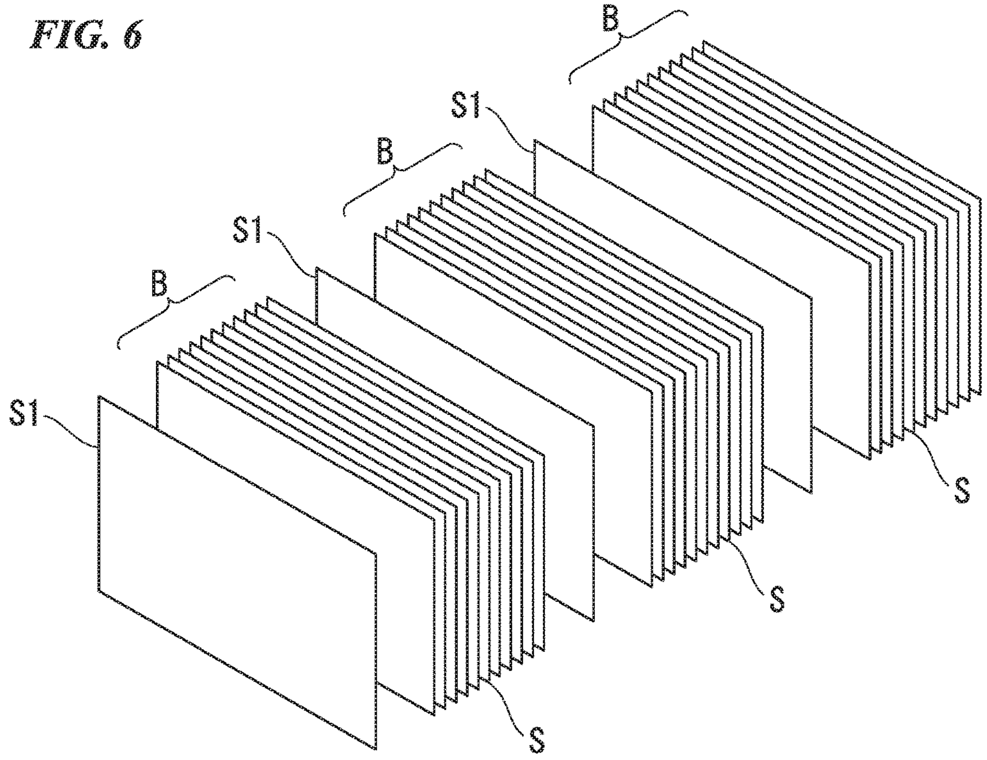
FIG. 6 is a perspective view of partition sheets and bill blocks processed by the bill processing device according to the embodiment of the present invention.

A plurality of bills S continuously stacked and gathered together in the thickness direction 1 form a bill block B, and the bill processing device 11 can continuously process a plurality of blocks B, as shown in FIG. 6. One bill block B is for example set to an account number unit. A dividing sheet S1 for recognizing each bill block B is provided in a place immediately before each bill block B. A barcode or the like for identification is printed on the dividing sheet S1.

In addition to first reject bills identified as other than normal bills and other than second reject bills by the aforementioned identifying unit 22, the conveyance control unit 51 conveys the dividing sheet S1 to the first reject unit 13 by the conveying unit 21. Thereby, the first reject unit 13 removes the first reject bills and the dividing sheets S1 so they can be taken out of the bill processing device 11.

In the bill processing device 11 according to the present embodiment, the dividing sheet S1 is arranged at the position immediately preceding the front side of the bill block B in its feeding direction by the loading unit 12 (the lower side in the state of being set in the loading unit 12) for identifying the bill block B immediately following. That is, the dividing sheet S1 serves as a start card for identifying the starting end of each bill block B. The embodiment is not limited thereto, and the dividing sheet S1 may be arranged only at the position immediately following the rear side of each bill block B in its feeding direction (the upper side in the state of being set in the loading unit 12) as an end card for identifying the bill block B immediately preceding. Alternatively, the dividing sheet S1 may be arranged at both the front and rear sides of each bill block B in its feeding direction as a start card and end card for identifying the starting end and termination of each block B.

When a selection operation for performing the identification process is input to the operation display unit 31, the control main body unit 50 performs display in the operation display unit 31 requesting that the bills S be set in the loading unit 12. The operator, in accordance with this display, sets them in the loading unit 12 so that each dividing sheet S1 is arranged on the front side of its corresponding bill block B in the direction of feeding by the loading unit 12. That is, three bill blocks 13 and three dividing sheets S1 are set in the loading unit 12 in a vertically arranged manner, with the corresponding dividing sheet S1 positioned on the lower side of each bill block B, such that they are stacked in the order of the dividing sheet S1, the bill block 13 corresponding thereto, another dividing sheet S1, another bill block B corresponding thereto, yet another dividing sheet S1, and yet another bill block B corresponding thereto.

Then, when the operation instruction input for starting processing is input to the operation display unit 31, the control main body unit 50 causes the feeding by the loading unit 12 into the bill processing device 11 to start from the lowest dividing sheet S1, with the dividing sheets S1 and the bills S that have been fed being conveyed by the conveying unit 21. The dividing sheets S1 and the bills S during conveying by the conveying unit 21 are first identified by the identifying unit 22.

When the identifying unit 22 detects the first dividing sheet S1, the conveyance control unit 51 conveys this first dividing sheet S1 to the first reject unit 13. The identifying unit 22 sequentially identifies the bills S subsequent to the first dividing sheet S1. The conveyance control unit 51, by controlling the conveying unit 21, conveys the bills S that have been identified as normal bills from the identification result of the identifying unit 22 to the stacking unit 15 at the second stage from the top of the right column, among the second reject units 14 and stacking units 15 that are arranged in an array of three columns and four stages, conveys the first reject bills to the first reject unit 13, and conveys the second reject bills to the second reject unit 14 at the top stage of the right column.

When the identifying unit 22 detects the second dividing sheet S1, the control main body unit 50 judges the identification of the bills S of the bill block B between the first dividing sheet S1 and the second dividing sheet S1 to have ended. Then, based on the identification result of the identifying unit 22, the control main body unit 50 figures out the per-denomination count values and total sum of all the normal bills stacked in the stacking unit 15 at the second stage from the top of the right column, and stores them in the storage unit 33.

The conveyance control unit 51 conveys the second dividing sheet S1 identified by the identifying unit 22 to the first reject unit 13 as described above. The identifying unit 22 sequentially identifies the bills S subsequent to the second dividing sheet S1. The conveyance control unit 51, by controlling the conveying unit 21, conveys the bills S that have been identified as normal bills from the identification result of the identifying unit 22 to the stacking unit 15 at the lowest stage of the right column, conveys the first reject bills to the first reject unit 13, and conveys the second reject bills to the second reject unit 14 at the third stage from the top of the right column.

When the identifying unit 22 detects the third dividing sheet S1, the control main body unit 50 judges the identification of the bills S of the bill block 13 between the second dividing sheet S1 and the third dividing sheet S1 to have ended. Then, based on the identification result of the identifying unit 22, the control main body unit 50 figures out the per-denomination count values and total sum of all the normal bills stacked in the stacking unit 15 at the lowest stage of the right column, and stores them in the storage unit 33.

The conveyance control unit 51 controls the conveying unit 21 to convey the third dividing sheet S1 to the first reject unit 13, convey the bills identified as normal bills among the bills S subsequent to the third dividing sheet S1, to the stacking unit 15 at the second stage from the top of the middle column, convey the first reject bills to the first reject unit 13, and convey the second reject bills to the second reject unit 14 at the top stage of the middle column.

The control unit 32 performs the above processing until the set detection sensor 16 detects that there are no longer any bills S in the loading unit 12.

When the set detection sensor 16 detects that there are no longer any bills S in the loading unit 12, the control main body unit 50, having determined that the bills S of all the bill blocks B related to the current identification process have been identified and that all the normal bills have been counted, causes the operation display unit 31 to display the total sum based on the identification by the identifying unit 22 for each bill block B, that is, each stacking unit 15.

After the above process, the dividing sheets S1 and the first reject bills are stacked in the first reject unit 13 in sequence from the bottom. Based on the positional relation with the dividing sheets S1, it is possible to ascertain from which bill block B each first reject bill has been excluded. The second reject bills of each second reject unit 14 have been excluded from the same bill block B as the normal bills stacked in the respective stacking unit 15 adjacent below. Thereby, after the identification processing, the operator is able to ascertain for each bill block B the normal bills, the first reject bills, and the second reject bills.

Figure 7:
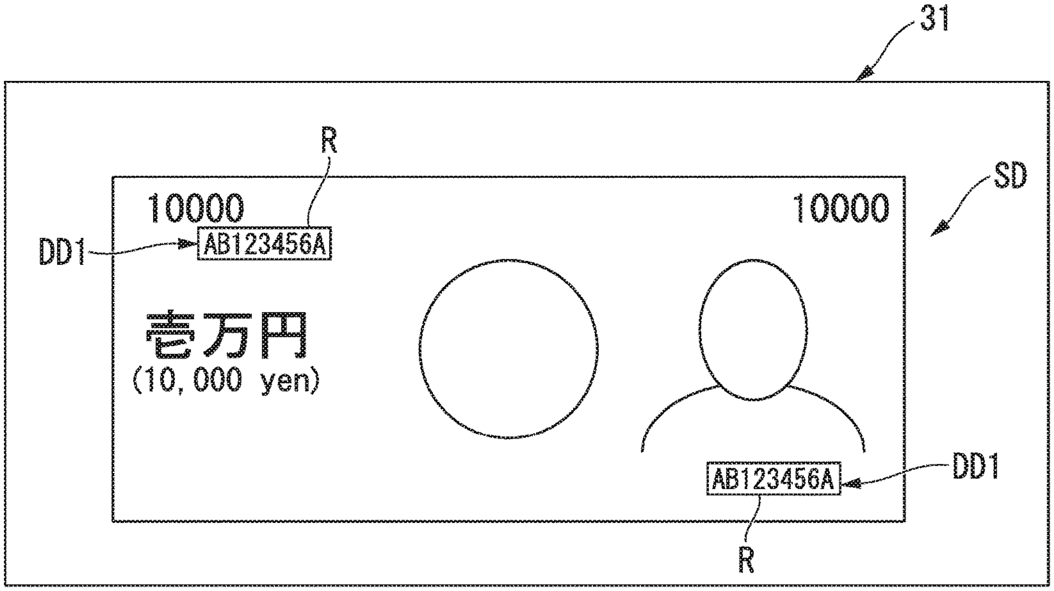
FIG. 7 is a front view showing an example of the display of an operation display unit of the bill processing device according to the embodiment of the present invention.

The control main body unit 50 stores in the storage unit 33 image data of the bills S detected by each of the one face image detecting unit 41A and the other face image detecting unit 41B of the image data capture unit 41 during the identification processing. That is, image data of both sides of every bill S fed out from the loading unit 12 during the identification processing is stored in the storage unit 33. It is described the case of those first reject bills excluded to the first reject unit 13 being ones in which the pair of serial number information do not match each other and ones in which the pair of serial number information are included in the excluded serial number information. In this case, the compositing unit 53 composites data so that serial number image data DD1 in image data SD of the side face of the bill on which the serial number information are formed is emphasized, in order to display the composite data in the operation display unit 31. For example, the compositing unit 53 composites (modifies) the image data SD so that the serial number image data DD1 is enclosed by a red frame, as shown in FIG. 7. The control main body unit 50 stores this composited image data in the storage unit 33.

Figure 8:
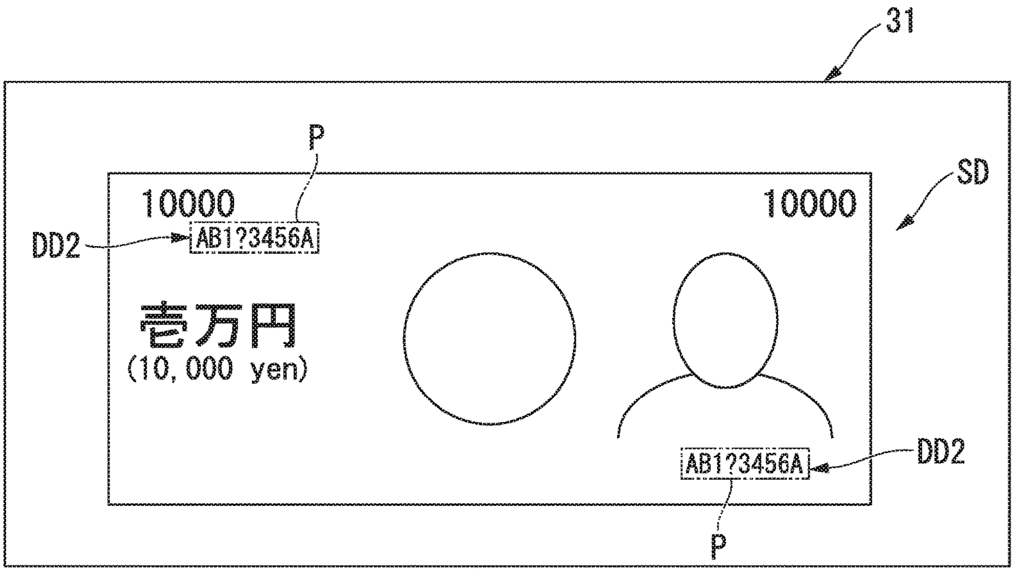
FIG. 8 is a front view showing another example of the display of the operation display unit of the bill processing device according to the embodiment of the present invention.

After one identification processing, for each second reject unit 14, the control main body unit 50 displays, on the operation display unit 31, image data of the serial number information formation side surface of each bill S whose serial number information is unreadable with the image data being arranged in the order of exclusion, to thereby perform a display requesting the operator to read the serial number information. Upon seeing this display, the operator takes the bills S from the second reject unit 14 in order from the bottom, performs visual inspection, and for those in which he or she is able to visually read the serial number information, manually inputs the serial number information into the operation display unit 31. Then, the compositing unit 53, as shown in FIG. 8, composites data so as to display in red characters image data DD2 of the manually input serial number information composited on the image data SD of the corresponding bill at the position P where the serial number information should be formed, and stores the composited image data in the storage unit 33. At this time, when a part of serial number information cannot be read visually, a symbol (for example, "?", "*" or the like) indicating it is unclear may be input in place of the unclear part. The compositing unit 53 composites data so as to display image data of the manually input serial number information with the unclear part replaced by the symbol indicating that it is unclear (for example "AB1?3456A" shown in FIG. 8) in red characters overlaid on the position P where the serial number information should be formed on the image data SD of the bill corresponding thereto. The control main body unit 50 stores this composited image data (composite image data) in the storage unit 33. Data may be composited so as to display the image data DD2 of the manually input serial number information at a position outside the frame of the image data SD of the bill corresponding thereto.

When serial number information is manually input, the control main body unit 50 determines whether or not the information matching this serial number information is in the excluded serial number information stored in the storage unit 33. In the case of this serial number information being in the excluded serial number information, the control main body unit 50 displays an alarm symbol in the operation display unit 31 indicating it is counterfeit. At this time as well, in the case of serial number information having been input in which an unclear part is replaced with a symbol indicating it is unclear, for only the part that is clear, the control main body unit 50 determines whether or not a match is in the excluded serial number information stored in the storage unit 33. In the case of this serial number information being in the excluded serial number information, the control main body unit 50 displays an alarm symbol in the operation display unit 31 indicating it is counterfeit.

On the basis of the identification result displayed in the operation display unit 31, the operator, using for example an online terminal not illustrated, performs an operation of depositing the amount of each bill block B into the account of the corresponding account number.

As described above, the control main body unit 50, in response to an operation input into the operation display unit 31, reads and displays on the operation display unit 31 the image data of bills of each bill block B processed by each identification process from the storage unit 33. This image data includes image data that highlights anomalies of the serial number information and image data of bills in which manually input serial number information are composited. Thereby, the image data of all bills, including the image data of bills on which is composited highlighting of the anomalies of the serial number information and the image data of bills on which is composited manually input serial number information, can be confirmed afterward.

The second reject units 14 and the stacking units 15 have the same construction, and by a setting changing process of the bill processing device 11 performed by an operation input to the operation display unit 31, it is possible to use all of the second reject units 14 as the stacking units 15 that stack normal bills. In the case of performing such a setting so that there are no second reject units 14, the second reject bills that should be excluded to the second reject units 14 come to be excluded to the first reject unit 13.

By a setting change process of the bill processing device 11 performed by an operation input to the operation display unit 31, a combination of the stacking unit 15, the second reject unit 14, and a third reject unit may be set with respect to each bill block B. A bill to be excluded to the third reject unit meets, for example, all the following criteria: Its main discrimination data does not match the master data with a predetermined matching degree or more; its pair of serial number information can be read and agree with each other; an entry matching its serial number information is not among the excluded serial number information. In this case, the highest stage of a given column is made the second reject unit 14, the second stage from the top of the same column is made the third reject unit corresponding thereto, and the third stage from the top of the same column is made the stacking unit 15 corresponding thereto. A fourth reject unit may be additionally added at the third stage from the top of the same column, with the fourth stage from the top of the same column being made the stacking unit 15 corresponding thereto, with bills whose read serial number information fall under those subject to exclusion being excluded to the fourth reject unit. The types of bills to be excluded at each stage can be suitably set.

The setting is not limited to the above-described one, that is, the setting that determines whether or not the pair of serial number information agree with each other by whether or not the entire character strings of the pair of serial number information agree with each other. In accordance with a setting change process of the bill processing device 11 performed by an operation input to the operation display unit 31, it is possible to configure a setting that determines whether or not the pair of serial number information match each other by whether or not predetermined partial common sections of the entire character strings match each other in the pair of serial number information. In this setting, if the predetermined partial common sections of the entire character strings match each other for the pair of serial number information, the pair of serial number information are determined to match. On the other hand, if the predetermined partial common sections of the entire character strings do not match each other for the pair of serial number information, the pair of serial number information are determined not to match. Here, the predetermined partial common sections for determining the match of the pair of serial number information can be set by an operation input to the operation display unit 31. For example, the third and fourth places of the entire character string may be set to the predetermined partial common sections, or the third and fifth places of the entire character string may be set to the predetermined partial common sections.

Moreover, it is possible to configure a setting in which if the predetermined partial common sections at a plurality of sections in the entire character strings all match each other in the pair of serial number information, the pair of serial number information are determined to match, while if at least any section of the predetermined partial common sections at the plurality of sections does not match in the pair of serial number information, the pair of serial number information are determined not to match. For example, the first and second places of the entire character string may be set to one predetermined partial common section, and the fifth and sixth places of the entire character string may be set to another predetermined partial common section. If each of both common sections match, the pair of serial number information are determined to match, while if at least any one of both common sections do not match, the pair of serial number information are determined to not match.

Figure 9:
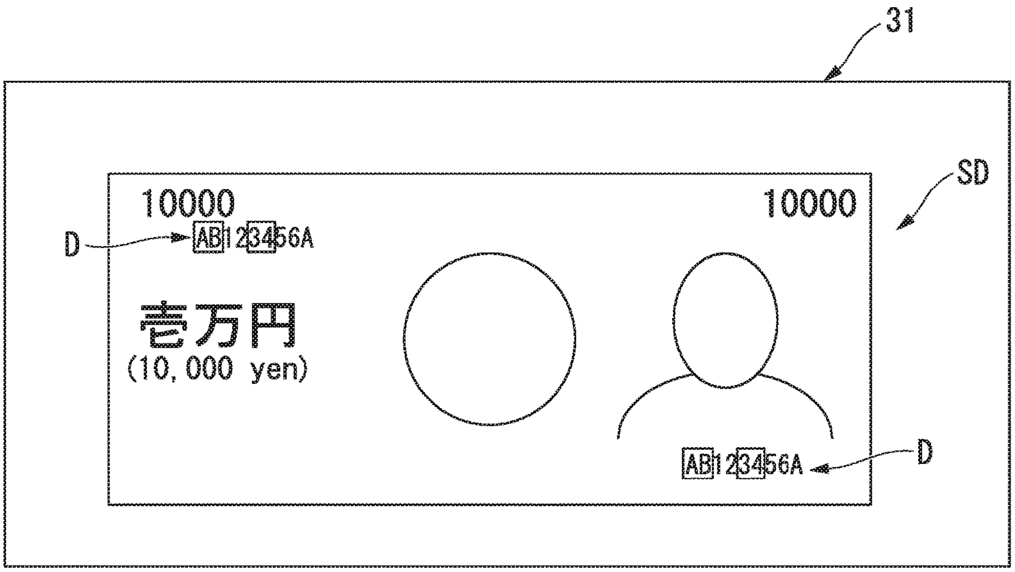
FIG. 9 is a front view showing yet another example of the display of the operation display unit of the bill processing device according to the embodiment of the present invention a front view of a bill processed by the bill processing device according to the embodiment of the present invention, the bill being one on which image data for highlighting of predetermined partial common sections are composed.

The image data of the bills S detected by the one face image detecting unit 41A and the other face image detecting unit 41B of the image data capture unit 41 during the identification processing are stored in the storage unit 33, at which time the compositing unit 53 of the control unit 32 composites data so as to highlight, by for example enclosing in a red frame, the predetermined partial common sections on the image data of the bill S, and stores the data in the storage unit 33. That is, the compositing unit 53 composites image data for highlighting of the predetermined partial common sections, used when judging the agreement of the pair of serial number information, on the image data stored in the storage unit 33. FIG. 9 shows display by the operation display unit 31, which includes image data SD of a bill on which image data for highlighting of partial common sections are composed in a case where the first and second places of the entire character string is set to one predetermined partial common section, and the fifth and sixth places of the entire character string is set to another predetermined partial common section.

According to the bill processing device 11 of the present embodiment described above, the bills S fed from the loading unit 12 are sorted into bills S whose serial number information D can be read by the image data capture unit 41 and the OCR unit 45, and bills S whose serial number information D cannot be read by the image data capture unit 41 and the OCR unit 45. That is, it is possible to sort bills S with unreadable serial number information D, for which careful confirmation work by the operator is required. Accordingly, it is possible to lighten the burden on the operator for work relating to excluded bills S.

Also, among the bills S fed from the loading unit 12, the bills S whose denomination can be identified by the image data capture unit 41 of the identifying unit 22 and whose serial number information D can be read by the image data capture unit 41 and the OCR unit 45 are stacked in the stacking unit 15. In addition, among the bills S fed from the loading unit 12, the bills S whose denomination cannot be identified by the image data capture unit 41 of the identifying unit 22 are excluded to the first reject unit 13. Moreover, among the bills S fed from the loading unit 12, the bills S whose denomination can be identified by the image data capture unit 41 of the identifying unit 22 and whose serial number information D cannot be read by the image data capture unit 41 and the OCR unit 45 are excluded to the second reject unit 14. Thereby, it is possible to sort bills S with unreadable serial number information D, for which careful confirmation work by the operator is required. Accordingly, it is possible to lighten the burden on the operator for work relating to excluded bills S.

Also, since the second reject unit 14 can also be used as a second stacking unit that stacks bills whose denomination can be identified by the image data capture unit 41 of the identifying unit 22 and serial number information D can be read by the image data capture unit 41 and the OCR unit 45, settings meeting customers' needs are possible.

Also, among the bills S fed from the loading unit 12, the bills S whose serial number information D can be read by the image data capture unit 41 and the OCR unit 45 and whose serial number information D that was read does not fall under those subject to exclusion are stacked in the stacking unit 15. Also, among the bills S fed from the loading unit 12, the bills S whose serial number information D can be read by the image data capture unit 41 and the OCR unit 45 and whose serial number information D that was read are subject to exclusion are excluded to the first reject unit 13.

Also, among the bills S fed from the loading unit 12, the bills S whose serial number information D cannot be read by the image data capture unit 41 and the OCR unit 45 are excluded to the second reject unit 14. Thereby, bills S whose serial number information D are subject to exclusion and bills S whose serial number information D is unreadable can be sorted and excluded. That is, it is possible to sort bills S whose serial number information D are subject to exclusion, for which careful confirmation work by the operator is not required, and bills S whose serial number information D is unreadable, for which careful confirmation work by the operator is required. Accordingly, compared to the case of excluding them together, it is possible to lighten the burden on the operator for work relating to excluded bills S.

Also, since the second reject unit 14 can also be used as a second stacking unit that stacks the bills S whose serial number information D can be identified by the image data capture unit 41 and the OCR unit 45 and whose serial number information D that was read are not subject to exclusion, settings meeting customers' needs are possible.

In addition, when an operator who has visually confirmed the bills S whose serial number information D cannot be identified by the image data capture unit 41 and the OCR unit 45 inputs the visually confirmed serial number information D into the operation display unit 31, the compositing unit 53 composites image data of the serial number information D input into the operation display unit 31 on the image data, stored in the storage unit 33, of the bills S whose serial number information D could not be read by the image data capture unit 41 and the OCR unit 45. The operation display unit 31 displays image data of the bills S with unreadable serial number information D on which the serial number information D was composited in this way. Thereby, it is possible to easily confirm the image data of the bills S with unreadable serial number information D on which image data of the serial number information D was composited.

Also, the operation display unit 31 is capable of inputting an unclear part of the serial number information with a symbol indicating it is unclear, and the compositing unit 53 composites image data of the serial number information D inputted into the operation display unit 31, including the symbol indicating the part that is unclear, on image data of the bills S whose serial number information D cannot be read by the image data capture unit 41 and the OCR unit 45. The operation display unit 31 displays the image data of the bills S with unreadable serial number information D, on which the serial number information D including the symbol indicating the part that is unclear have been composited in this manner. Thereby, it is possible to easily confirm the image data of the bills S with unreadable serial number information D, on which image data of the serial number information D including the symbol indicating the part that is unclear have been composited.

According to the bill processing device 11 of the present embodiment, when the image data capture unit 41 and the OCR unit 45 read from the bill S fed from the loading unit 12 the pair of serial number information D formed on this bill S, the determining unit 54 determines whether or not the pair of serial number information D match each other. The first reject unit 13 excludes the bills S whose pair of serial number information D are determined not to match each other. That is, paying attention to the fact that the pair of serial number information D match each other in a genuine bill, the bill S in which the pair of serial number information D do not match each other is judged to be a counterfeit bill and excluded to the first reject unit 13. Accordingly, it is possible to perform more accurate authenticity determination.

Also, since the determining unit 54 determines whether or not predetermined partial common sections of the pair of serial number information D match each other, the determination process becomes easy, and a shortening of the determination process time is achieved.

Also, since the operation display unit 31 can selectively set the predetermined partial common sections, it is possible to appropriately match the predetermined partial common sections for determining whether or not a pair of serial number information match each other with counterfeit bills that are in circulation.

Also, the compositing unit 53 composites image data of highlighting of the predetermined partial common sections on the image data that is stored in the storage unit 33. The operation display unit 31 displays the composited image data of the bills S whose serial number information D is unreadable on which highlighting of the predetermined partial common sections is composited. Thereby, from the image data of the bills S on which highlighting of the predetermined partial common sections is composited, it is possible to easily confirm the predetermined partial common sections used when judging the agreement of the pair of serial number information D.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A bill processing device comprising:

a loading unit configured to feed a bill having a pair of serial number information;

a reading unit configured to read the pair of serial number information from the fed bill;

a determining unit configured to determine whether at least a portion of the pair of serial numbers match each other;

a stacking unit configured to stack the bill in a case where the determining unit has determined that the at least a portion of the pair of serial numbers match each other;

a reject unit configured to receive the bill in a case where the determining unit has determined that the at least a portion of the pair of serial numbers do not match each other;

an image data capture unit configured to capture image data of an unreadable bill whose serial number information is unreadable by the reading unit;

an input unit configured to receive an input of serial number information;

a compositing unit configured to composite, on the image data of the unreadable bill, image data showing the input serial number information, to generate composite image data; and a display unit configured to display the composite image data;

wherein the input unit is configured to receive, as the input of the serial number information, an input of serial number information including a symbol indicating an unclear part, and the compositing unit is configured to composite, on the image data of the unreadable bill, image data showing the input serial number information including the symbol.

2. The bill processing device according to claim 1, wherein the determining unit is configured to determine whether predetermined partial common sections of the pair of serial numbers match each other.

3. The bill processing device according to claim 2, further comprising:

a setting unit configured to set the predetermined partial common sections.

4. The bill processing device according to claim 2, wherein:

the image data capture unit is configured to capture image data of the fed bill;

the compositing unit is configured to composite, on the captured image data of the fed bill, image data for highlighting the predetermined partial common sections, to generate composite image data in which the predetermined partial common sections is highlighted; and the display unit configured to display the composite image data in which the predetermined partial common sections is highlighted.

5. A bill processing device comprising:

a bill loader configured to feed a bill having a pair of serial number information;

a bill reader configured to read the pair of serial number information from the fed bill;

a processor configured to determine whether at least a portion of the pair of serial numbers match each other;

a bill stacker configured to stack the bill in a case where the processor has determined that the at least a portion of the pair of serial numbers match each other;

a reject bin configured to receive the bill in a case where the processor has determined that the at least a portion of the pair of serial numbers do not match each other;

an image reader configured to capture image data of an unreadable bill whose serial number information is unreadable by the bill reader;

wherein the processor is configured to receive an input of serial number information;

wherein the processor is configured to composite, on the image data of the unreadable bill, image data showing the input serial number information, to generate composite image data; and a display configured to display the composite image data;

wherein the processor receives, as the input of the serial number information, an input of serial number information including a symbol indicating an unclear part, and the processor composites, on the image data of the unreadable bill, image data showing the input serial number information including the symbol.

6. The bill processing device according to claim 5, wherein the processor is configured to determine whether predetermined partial common sections of the pair of serial numbers match each other.

7. The bill processing device according to claim 6, wherein the processor is further configured to set the predetermined partial common sections.

8. The bill processing device according to claim 6, wherein:

the image reader is configured to capture image data of the fed bill;

the processor is configured to composite, on the captured image data of the fed bill, image data for highlighting the predetermined partial common sections, to generate composite image data in which the predetermined partial common sections is highlighted; and the display is configured to display the composite image data in which the predetermined partial common sections is highlighted.

9. The bill processing device according to claim 5, wherein the display is configured to display the serial number information unreadable by the bill reader in a manner in which the displayed serial number information is capable of being visually confirmed by an operator, and the processor is configured to receive, from the operator, an input of serial number information visually confirmed by the operator.

* * * * *